United States Patent
Baek et al.

(10) Patent No.: US 11,870,070 B2
(45) Date of Patent: *Jan. 9, 2024

(54) POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: So Ra Baek, Daejeon (KR); Min Suk Kang, Daejeon (KR); Sang Wook Lee, Daejeon (KR); Wang Mo Jung, Daejeon (KR); Dong Hun Lee, Daejeon (KR); Hye Lim Jeon, Daejeon (KR); Eun Sol Lho, Daejeon (KR)

(73) Assignee: LG Energy Solution, Ltd.

( * ) Notice: Subject to any disclaimer, the term of this patent is extended or adjusted under 35 U.S.C. 154(b) by 225 days.

This patent is subject to a terminal disclaimer.

(21) Appl. No.: 16/771,139

(22) PCT Filed: Jan. 23, 2019

(86) PCT No.: PCT/KR2019/000970
§ 371 (c)(1),
(2) Date: Jun. 9, 2020

(87) PCT Pub. No.: WO2019/147017
PCT Pub. Date: Aug. 1, 2019

(65) Prior Publication Data
US 2021/0151754 A1    May 20, 2021

(30) Foreign Application Priority Data
Jan. 24, 2018    (KR) .................... 10-2018-0008909

(51) Int. Cl.
| | | |
|---|---|---|
| H01M 4/525 | (2010.01) | |
| H01M 4/04 | (2006.01) | |
| H01M 4/36 | (2006.01) | |
| H01M 4/505 | (2010.01) | |
| H01M 10/0525 | (2010.01) | |
| H01M 4/13915 | (2010.01) | |
| H01M 4/131 | (2010.01) | |
| H01M 4/1315 | (2010.01) | |
| H01M 4/1391 | (2010.01) | |
| H01M 4/62 | (2006.01) | |
| C01G 53/00 | (2006.01) | |
| C01B 35/12 | (2006.01) | |
| H01M 4/02 | (2006.01) | |

(52) U.S. Cl.
CPC .......... *H01M 4/525* (2013.01); *C01B 35/121* (2013.01); *C01G 53/50* (2013.01); *H01M 4/0471* (2013.01); *H01M 4/131* (2013.01); *H01M 4/1315* (2013.01); *H01M 4/1391* (2013.01); *H01M 4/13915* (2013.01); *H01M 4/366* (2013.01); *H01M 4/505* (2013.01); *H01M 4/628* (2013.01); *H01M 10/0525* (2013.01); *C01P 2004/80* (2013.01); *C01P 2006/40* (2013.01); *C01P 2006/80* (2013.01); *H01M 2004/028* (2013.01); *Y02E 60/10* (2013.01)

(58) Field of Classification Search
CPC .... H01M 4/525; H01M 4/0471; H01M 4/366; H01M 4/505; H01M 10/0525; H01M 2004/028; H01M 4/62; H01M 10/052
See application file for complete search history.

(56) References Cited

U.S. PATENT DOCUMENTS

| | | | |
|---|---|---|---|
| 11,121,357 B2 * | 9/2021 | Baek | ..................... H01M 4/483 |
| 2002/0110736 A1 | 8/2002 | Kweon et al. | |
| 2003/0148182 A1 * | 8/2003 | Park | ..................... H01M 4/1391 |
| | | | 429/231.95 |
| 2004/0110065 A1 | 6/2004 | Hamano et al. | |
| 2008/0280205 A1 | 11/2008 | Jiang et al. | |
| 2014/0170494 A1 | 6/2014 | Paulsen et al. | |

(Continued)

FOREIGN PATENT DOCUMENTS

| | | |
|---|---|---|
| CN | 1773763 A | 5/2006 |
| CN | 102832389 A | 12/2012 |
| CN | 104781960 A | 7/2015 |
| CN | 105431382 A | 3/2016 |
| EP | 3028995 A1 | 6/2016 |
| JP | 2002158011 A | 5/2002 |
| JP | 2015536558 A | 12/2015 |
| JP | 2017050204 A | 3/2017 |

(Continued)

OTHER PUBLICATIONS

International Search Report for Application No. PCT/KR2019/000970 dated May 9, 2019, 2 pages.

(Continued)

*Primary Examiner* — Adam A Arciero
(74) *Attorney, Agent, or Firm* — Lerner David LLP (57) ABSTRACT

A positive electrode active material for a secondary battery includes a lithium composite transition metal oxide including nickel (Ni), cobalt (Co), and manganese (Mn), and a glassy coating layer formed on surfaces of particles of the lithium composite transition metal oxide, wherein, in the lithium composite transition metal oxide, an amount of the nickel (Ni) in a total amount of transition metals is 60 mol % or more, and an amount of the manganese (Mn) is greater than an amount of the cobalt (Co), and the glassy coating layer includes a glassy compound represented by Formula 1.

$$Li_a M^1_b O_c$$ [Formula 1]

wherein, $M^1$ is at least one selected from the group consisting of boron (B), aluminum (Al), silicon (Si), titanium (Ti), and phosphorus (P), and $1 \leq a \leq 4$, $1 \leq b \leq 8$, and $1 \leq c \leq 20$.

6 Claims, 3 Drawing Sheets

(56) References Cited

U.S. PATENT DOCUMENTS

| | | | |
|---|---|---|---|
| 2015/0221943 A1* | 8/2015 | Nishioka | H01M 4/505 |
| | | | 429/223 |
| 2016/0013476 A1 | 1/2016 | Oh et al. | |
| 2016/0190573 A1 | 6/2016 | Sun et al. | |
| 2017/0294651 A1 | 10/2017 | Choi et al. | |
| 2017/0317342 A1 | 11/2017 | Kang et al. | |

FOREIGN PATENT DOCUMENTS

| | | |
|---|---|---|
| JP | 2017084674 A | 5/2017 |
| JP | 2018506141 A | 3/2018 |
| KR | 20040049811 A | 6/2004 |
| KR | 20100017344 A | 2/2010 |
| KR | 101562722 B1 | 10/2015 |
| KR | 20160045029 A | 4/2016 |
| KR | 101651338 B1 | 8/2016 |
| KR | 101746187 B1 | 6/2017 |
| KR | 20170103507 A | 9/2017 |
| KR | 20170113366 A | 10/2017 |
| WO | 2017095134 A1 | 6/2017 |

OTHER PUBLICATIONS

1 European Search Report for Application No. EP19744539, dated Nov. 9, 2020, 7 pages.

* cited by examiner

POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2019/000970, filed Jan. 23, 2019, which claims priority to Korean Patent Application No. 10-2018-0008909, filed Jan. 24, 2018, the disclosures of which are incorporated herein by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide'), in which a portion of nickel (Ni) is substituted with cobalt (Co) and manganese (Mn), has been developed. However, since capacity characteristics of conventionally developed NCM-based lithium composite transition metal oxides are insufficient, the NCM-based lithium composite transition metal oxides have been limited in application.

In order to address such limitation, studies have recently been made to increase a nickel (Ni) content in the NCM-based lithium composite transition metal oxides. However, with respect to a high-Ni positive electrode active material having a high nickel content, since structural stability and chemical stability of the active material are low, there is a limitation in that thermal stability is rapidly reduced. Also, since lithium by-products present in the form of LiOH and $Li_2CO_3$ on the surface of the positive electrode active material are increased as the nickel content in the active material is increased, a swelling phenomenon occurs, and thus, lifetime and stability of the battery may be reduced.

Furthermore, if a concentration of manganese (Mn) is increased to improve thermal stability of the high-Ni positive electrode active material, particle strength of the active material is reduced to cause particle breakage during electrode rolling, and, as a result, there were limitations in that high-temperature life characteristics were reduced and gas was generated during high-temperature storage.

DISCLOSURE OF THE INVENTION

Technical Problem

An aspect of the present invention provides a positive electrode active material for a secondary battery, in which, in a high-Ni NCM-based positive electrode active material containing nickel (Ni) in an amount of 60 mol % or more to secure high capacity, thermal stability may be improved, residual amounts of lithium by-products may be reduced, and particle breakage during electrode rolling may be prevented by improving particle strength of the positive electrode active material.

Technical Solution

According to an aspect of the present invention, there is provided a positive electrode active material for a secondary battery which includes a lithium composite transition metal oxide including nickel (Ni), cobalt (Co), and manganese (Mn); and a glassy coating layer formed on surfaces of particles of the lithium composite transition metal oxide, wherein, in the lithium composite transition metal oxide, an amount of the nickel (Ni) in a total amount of transition metals is 60 mol % or more, and an amount of the manganese (Mn) is greater than an amount of the cobalt (Co), and the glassy coating layer includes a glassy compound represented by Formula 1.

$$Li_a M^1{}_b O_c \qquad \text{[Formula 1]}$$

In Formula 1, $M^1$ is at least one selected from the group consisting of boron (B), aluminum (Al), silicon (Si), titanium (Ti), and phosphorus (P), and 1≤a≤4, 1≤b≤8, and 1≤c≤20.

According to another aspect of the present invention, there is provided a method of preparing a positive electrode active material for a secondary battery which includes preparing a lithium composite transition metal oxide including nickel (Ni), cobalt (Co), and manganese (Mn); and forming a glassy coating layer by dry mixing the lithium composite transition metal oxide with a coating source including at least one selected from the group consisting of B, Al, Si, Ti, and P, and performing a heat treatment, wherein, in the lithium composite transition metal oxide, an amount of the nickel (Ni) in a total amount of transition metals is 60 mol % or more, and an amount of the manganese (Mn) is greater than an amount of the cobalt (Co), and the glassy coating layer includes a glassy compound represented by Formula 1.

$$Li_a M^1{}_b O_c \qquad \text{[Formula 1]}$$

In Formula 1, $M^1$ is at least one selected from the group consisting of B, Al, Si, Ti, and P, and 1≤a≤4, 1≤b≤8, and 1≤c≤20.

According to another aspect of the present invention, there is provided a positive electrode and a lithium secondary battery which include the positive electrode active material.

Advantageous Effects

A positive electrode active material for a secondary battery according to the present invention is a high-Ni NCM-based positive electrode active material containing nickel (Ni) in an amount of 60 mol % or more, wherein high capacity may be secured, and particle strength may be improved due to a glassy coating layer while improving thermal stability by increasing a concentration of manganese (Mn). Also, since a portion of lithium by-products present in the high-Ni lithium composite transition metal oxide reacts to form the glassy coating layer, an effect of reducing the lithium by-products may also occur.

Furthermore, if the positive electrode active material according to the present invention is used to prepare a positive electrode for a secondary battery, particle breakage during electrode rolling may be prevented, and, as a result, high-temperature life characteristics of the secondary battery may be improved and gas generation during high-temperature storage may be suppressed.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention includes a lithium composite transition metal oxide including nickel (Ni), cobalt (Co), and manganese (Mn); and a glassy coating layer formed on surfaces of particles of the lithium composite transition metal oxide.

The lithium composite transition metal oxide is a high-nickel (Ni) NCM including nickel (Ni), cobalt (Co), and manganese (Mn), in which an amount of the nickel (Ni) in a total amount of transition metals is 60 mol % or more. Preferably, the amount of the nickel (Ni) in the total amount of the transition metals may be 80 mol % or more. In a case in which the amount of the nickel (Ni) in the total amount of the transition metals is 60 mol % or more, high capacity may be secured.

Also, in the lithium composite transition metal oxide, an amount of the manganese (Mn) is greater than an amount of the cobalt (Co). Since the manganese (Mn) is included in an amount greater than the cobalt (Co), thermal stability may be improved. Preferably, the amount of the manganese (Mn) in the total amount of the transition metals may be in a range of 15 mol % to 35 mol %, for example, 15 mol % to 25 mol %, and the amount of the cobalt (Co) may be in a range of 18 mol % or less, for example, 5 mol % to 16 mol %.

Specifically, the lithium composite transition metal oxide may be represented by Formula 2 below.

$$Li_p Ni_{1-(x1+y1+z1)} Co_{x1} Mn_{y1} M^2{}_{z1} M^3{}_{q1} O_2 \qquad \text{[Formula 2]}$$

In Formula 2, $M^2$ is at least one element selected from the group consisting of aluminum (Al), zirconium (Zr), boron (B), tungsten (W), magnesium (Mg), cerium (Ce), hafnium (Hf), tantalum (Ta), titanium (Ti), strontium (Sr), barium (Ba), fluorine (F), phosphorus (P), sulfur (S), and lanthanum (La), $M^3$ is at least one element selected from the group consisting of Al, Zr, Ti, Mg, Ta, niobium (Nb), molybdenum (Mo), W, and chromium (Cr), and $0.9 \leq p \leq 1.1$, $0 < x1 \leq 0.4$, $0 < y1 \leq 0.4$, $0 \leq z1 \leq 0.1$, $0 \leq q1 \leq 0.1$, $x1 < y1$, and $0 < x1+y1+z1 \leq 0.4$.

In the lithium composite transition metal oxide of Formula 2, lithium (Li) may be included in an amount corresponding to p, that is, $0.9 \leq p \leq 1.1$. When p is less than 0.9, capacity may be reduced, and, when p is greater than 1.1, since particles are sintered in a sintering process, the preparation of the positive electrode active material may be difficult. The Li may more preferably be included in an amount satisfying $1.0 \leq p \leq 1.05$, in consideration of balance between a significant capacity characteristics improvement effect of the positive electrode active material and sinterability during the preparation of the positive electrode active material due to the control of the amount of the Li.

In the lithium composite transition metal oxide of Formula 2, Ni may be included in an amount corresponding to $1-(x1+y1+z1)$, for example, $0.6 \leq 1-(x1+y1+z1) < 1$. If the amount of the Ni in the lithium composite transition metal oxide of Formula 2 is 0.6 or more, since the amount of Ni, which is sufficient to contribute to charge and discharge, is secured, high capacity may be achieved. The Ni may more preferably be included in an amount satisfying $0.8 \leq 1-(x1+y1+z1) \leq 0.9$.

In the lithium composite transition metal oxide of Formula 2, Co may be included in an amount corresponding to x1, that is, $0 < x1 \leq 0.4$. In a case in which the amount of the Co in the lithium composite transition metal oxide of Formula is greater than 0.4, there is a concern that cost may increase. The Co may specifically be included in an amount satisfying $0 < x1 \leq 0.18$, for example, $0.05 \leq x1 \leq 0.16$, in consideration of a significant capacity characteristics improvement effect due to the inclusion of the Co, and may be included in an amount smaller than Mn.

In the lithium composite transition metal oxide of Formula 2, Mn may be included in an amount corresponding to y1, that is, 0<y1≤0.4. If y1 in the lithium composite transition metal oxide of Formula 2 is greater than 0.4, there is a concern that output characteristics and capacity characteristics of the battery may be reduced. In consideration of a life characteristics improvement effect due to the inclusion of the Mn, the Mn may specifically be included in an amount satisfying 0.15≤y1≤0.35, for example, 0.15≤y1≤0.25. In order to improve stability of the active material and, as a result, to improve stability of the battery, the Mn may be included in an amount greater than the Co.

In the lithium composite transition metal oxide of Formula 2, $M^2$ may be a doping element included in a crystal structure of the lithium composite transition metal oxide, wherein the $M^2$ may be included in an amount corresponding to z1, that is, 0≤z1≤0.1.

In the lithium composite transition metal oxide of Formula 2, an metallic element of $M^3$ may not be included in the lithium composite transition metal oxide structure, and a lithium composite transition metal oxide, in which the surface of the lithium composite transition metal oxide is doped with the $M^3$, may be prepared by a method of mixing and sintering a $M^3$ source together when a precursor and a lithium source are mixed and sintered, or a method of forming a lithium composite transition metal oxide and then separately adding and sintering the $M^3$ source. The $M^3$ may be included in an amount corresponding to q1, that is, an amount that does not degrade characteristics of the positive electrode active material within a range of 0≤q1≤0.1.

The positive electrode active material of the present invention includes a glassy coating layer formed on surfaces of particles of the lithium composite transition metal oxide. The glassy coating layer includes a glassy compound represented by Formula 1 below.

$$Li_aM^1{}_bO_c$$ [Formula 1]

In Formula 1, $M^1$ is at least one selected from the group consisting of B, Al, silicon (Si), Ti, and P, and 1≤a≤4, 1≤b≤8, and 1≤c≤20.

If a concentration of the manganese (Mn) is increased to improve thermal stability of the high-nickel (Ni) positive electrode active material containing nickel (Ni) in an amount of 60 mol % or more, particle strength is reduced to cause particle breakage during electrode rolling, and, as a result, there were limitations in that high-temperature life characteristics were reduced and gas was generated during high-temperature storage. Also, with respect to the high-nickel (Ni) positive electrode active material containing nickel (Ni) in an amount of 60 mol % or more, since residual amounts of lithium by-products are increased, there were limitations in that a swelling phenomenon occurred, and lifetime and stability of the battery were reduced.

In order to address these limitations, the above-described glassy coating layer was formed on the surfaces of the particles of the lithium composite transition metal oxide in which the manganese (Mn) is included in an amount greater than the cobalt (Co) while the lithium composite transition metal oxide is a high-nickel (Ni) material containing nickel (Ni) in an amount of 60 mol % or more. Since the glassy coating layer was formed on the surfaces of the particles of the lithium composite transition metal oxide in which the manganese (Mn) is included in an amount greater than the cobalt (Co) while the lithium composite transition metal oxide is a high-nickel (Ni) material containing nickel (Ni) in an amount of 60 mol % or more, the particle strength was improved while the thermal stability of the positive electrode active material was improved, the particle breakage during electrode rolling may be prevented, and a degree of roll contamination may also be reduced. Also, since a portion of the lithium by-products reacts to form the glassy coating layer, the lithium by-products were reduced, the high-temperature life characteristics of the battery were improved, and the gas generation during high-temperature storage was suppressed.

The glassy coating layer may preferably include at least one selected from the group consisting of a lithium boron oxide and a lithium aluminum oxide. The glassy coating layer may more preferably include a lithium-boron-aluminum oxide.

In the glassy coating layer, boron and aluminum may be included at a ratio of 0.3 part by weight:1 part by weight to 0.8 part by weight:1 part by weight, and the boron and the aluminum may more preferably be included at a ratio of 0.4 part by weight:1 part by weight to 0.6 part by weight:1 part by weight. Since the content ratio of the boron to the aluminum satisfies the above range, the particle strength may be further improved and the high-temperature life characteristics and high-temperature storage stability may be further improved.

The glassy coating layer may be formed on surfaces of primary particles of the lithium composite transition metal oxide. The positive electrode active material according to an embodiment of the present invention may be a secondary battery formed by agglomeration of the primary particles, wherein the glassy coating layer may be formed on the surfaces of the primary particles and the glassy coating layer may also be formed on the surface of the secondary particle.

The glassy coating layer may be included in an amount of 0.02 part by weight to 0.2 part by weight, for example, 0.04 part by weight to 0.15 part by weight based on 100 parts by weight of the lithium composite transition metal oxide.

The glassy coating layer may be formed to a thickness of 20 nm to 100 nm, and may preferably be formed to a thickness of 40 nm to 80 nm.

The positive electrode active material of the present invention may have a particle strength of 150 MPa or more, and the particle strength may preferably satisfy a range of 150 MPa to 250 MPa, and may more preferably satisfy a range of 200 MPa to 250 MPa.

Also, in the positive electrode active material of the present invention, the amount of the residual lithium by-products may be in a range of 1.0 wt % or less, preferably 0.2 wt % to 0.8 wt %, and more preferably 0.3 wt % to 0.7 wt %.

<Method of Preparing Positive Electrode Active Material>

The positive electrode active material of the present invention is prepared by including the steps of: preparing a lithium composite transition metal oxide including nickel (Ni), cobalt (Co), and manganese (Mn); and forming a glassy coating layer by dry mixing the lithium composite transition metal oxide with a coating source including at least one selected from the group consisting of boron (B), aluminum (Al), silicon (Si), titanium (Ti), and phosphorus (P), and performing a heat treatment.

The lithium composite transition metal oxide is a lithium composite transition metal oxide in which an amount of the nickel (Ni) in a total amount of transition metals is mol % or more, and an amount of the manganese (Mn) is greater than an amount of the cobalt (Co). That previously described in the positive electrode active material may be equally applied to a more specific composition of the lithium composite transition metal oxide.

The glassy coating layer includes a glassy compound represented by Formula 1 below.

$$Li_aM^1{}_bO_c$$ [Formula 1]

In Formula 1, $M^1$ is at least one selected from the group consisting of B, Al, Si, Ti, and P, and 1≤a≤4, 1≤b≤8, and 1≤c≤20.

The glassy coating layer is formed by dry mixing a coating source including at least one selected from the group consisting of B, Al, Si, Ti, and P, and performing a heat treatment. In this case, a lithium source may not be separately added. With respect to the high-nickel (Ni) lithium composite transition metal oxide containing nickel (Ni) in an amount of 60 mol % or more, since the residual amounts of the lithium by-products are large, the lithium source is not separately added and a portion of the lithium by-products reacts to form the glassy coating layer, and thus, an effect of reducing the lithium by-products may also occur. In the positive electrode active material thus formed, the amount of the residual lithium by-products may be in a range of 1.0 wt % or less, preferably 0.2 wt % to 0.8 wt %, and more preferably 0.3 wt % to 0.7 wt %.

The coating source may include a compound containing at least one selected from the group consisting of boron (B) and aluminum (Al). For example, the coating source may include $H_3BO_3$, $B_2O_3$, $HBPO_4$, $(NH_4)_2B_4O_7$, $Al_2O_3$, $Al(OH)_3$, $Al(SO_4)_3$, or $Al(NO_3)_3$.

In the glassy coating layer, boron and aluminum may be included at a ratio of 0.3 part by weight:1 part by weight to 0.8 part by weight:1 part by weight, and the boron and the aluminum may more preferably be included at a ratio of 0.4 part by weight:1 part by weight to 0.6 part by weight:1 part by weight.

The coating source may be mixed in an amount of 0.02 part by weight to 2.0 parts by weight, for example, 0.04 part by weight to 1.0 part by weight based on 100 parts by weight of the lithium composite transition metal oxide.

The coating source is dry mixed with the lithium composite transition metal oxide and is then subjected to a heat treatment at 500° C. to 750° C. to form the glassy coating layer. The heat treatment may preferably be performed at 600° C. to 700° C.

<Positive Electrode and Secondary Battery>

According to another embodiment of the present invention, provided are a positive electrode for a lithium secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_a$ ($0<\alpha<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

100 parts by weight of $LiNi_{0.65}Co_{0.15}Mn_{0.20}O_2$ lithium composite transition metal oxide and 0.29 part by weight of $H_3BO_3$, as a coating source, were mixed and then heat-treated at 650° C. for 5 hours to prepare a positive electrode active material in which a coating layer of lithium boron oxide ($LiBO_2$, $Li_2B_4O_7$) (B 500 ppm) was formed on surfaces of $LiNi_{0.65}Co_{0.15}Mn_{0.20}O_2$ particles.

Example 2

A positive electrode active material, on which a coating layer of lithium boron oxide ($LiBO_2$, $Li_2B_4O_7$) (B 1,000 ppm) was formed, was prepared in the same manner as in Example 1 except that 0.58 part by weight of $H_3BO_3$ was mixed as a coating source.

Example 3

A positive electrode active material, on which a coating layer of lithium-boron-aluminum oxide ($Li_2B_5AlO_{10}$, $LiB_4Al_7O_{17}$) (B 500 ppm, Al 1,000 ppm) was formed, was prepared in the same manner as in Example 1 except that 0.29 part by weight of $H_3BO_3$ and 0.22 part by weight of $Al_2O_3$ were mixed as a coating source.

Comparative Example 1

A positive electrode active material, on which a coating layer was not formed, was prepared in the same manner as in Example 1 except that a coating source was not mixed.

Comparative Example 2

A positive electrode active material was prepared in the same manner as in Example 3 except that $LiNi_{0.6}Co_{0.2}Mn_{0.2}O_2$ lithium composite transition metal oxide was used.

Comparative Example 3

A positive electrode active material was prepared in the same manner as in Example 3 except that $LiNi_{0.5}Co_{0.2}Mn_{0.3}O_2$ lithium composite transition metal oxide was used.

Experimental Example 1: Particle Strength Evaluation

Figure 1:
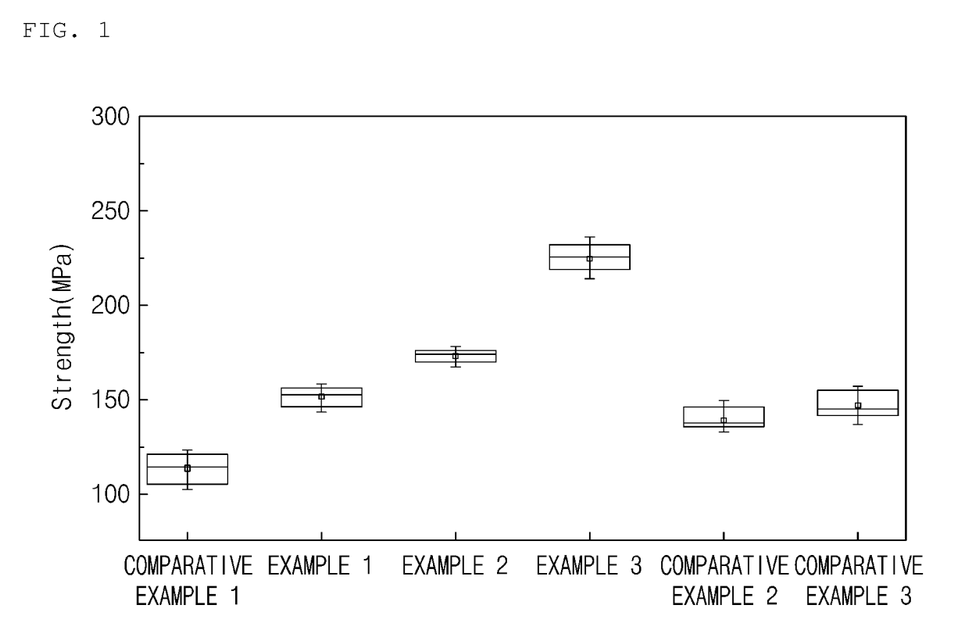
FIG. 1 is a graph illustrating results of measuring particle strengths of positive electrode active materials according to examples and comparative examples.

Particle strength was measured for the positive electrode active materials prepared in Examples 1 to 3 and Comparative Examples 1 to 3 using a Shimadzu MCT-W500 testing machine in such a manner that an indenter was in contact with the positive electrode active material particle to apply a force, and the results thereof are presented in Table 1 and FIG. 1.

TABLE 1

|  | Example 1 | Example 2 | Example 3 | Comparative Example 1 | Comparative Example 2 | Comparative Example 3 |
|---|---|---|---|---|---|---|
| Particle strength (MPa) | 151.6 | 173.2 | 225.5 | 113.5 | 137.1 | 145.2 |

Referring to Table 1 and FIG. 1, it may be confirmed that particle strengths of Examples 1 to 3, on which the glassy coating layers were respectively formed, were significantly improved in comparison to that of Comparative Example 1 on which a glassy coating layer was not formed. Particularly, Example 3, on which the lithium-boron-aluminum oxide coating layer was formed, exhibited a better particle strength improvement effect. With respect to Comparative Examples 2 and 3 in which the amount of manganese (Mn) was not greater than the amount of cobalt (Co), or the amount of nickel (Ni) was less than 60 mol %, particle strengths were lower than those of Examples 1 to 3.

Experimental Example 2: Residual Lithium By-Products Evaluation

After 10 g of each of the positive electrode active materials prepared in Examples 1 to 3 and Comparative Examples 1 and 2 was dispersed in 100 mL of water, a change in pH was measured while the solution was titrated with 0.1 M HCl to obtain a pH titration curve. A residual amount of LiOH and a residual amount of $Li_2CO_3$ in each positive electrode active material were calculated by using the pH titration curve, and a sum of these values was evaluated as a total residual amount of the lithium by-products and is listed in Table 2 below.

TABLE 2

|  | LiOH residual amount (wt %) | $Li_2CO_3$ residual amount (wt %) | Total lithium by-products residual amount (wt %) |
|---|---|---|---|
| Example 1 | 0.41 | 0.45 | 0.86 |
| Example 2 | 0.34 | 0.39 | 0.73 |
| Example 3 | 0.26 | 0.33 | 0.59 |
| Comparative Example 1 | 0.63 | 0.54 | 1.17 |
| Comparative Example 2 | 0.47 | 0.49 | 0.96 |

Referring to Table 2, with respect to Examples 1 to 3 on which the glassy coating layers were respectively formed, amounts of the residual lithium by-products were significantly reduced in comparison to those of Comparative Example 1 on which a glassy coating layer was not formed.

Experimental Example 3: Particle Breakage Evaluation

Each of the positive electrode active materials prepared in Examples 1 to 3 and Comparative Examples 1 to 3, a carbon black conductive agent, and a PVdF binder were mixed in an N-methylpyrrolidone solvent at a weight ratio of 96.5:1.5:2 to prepare a positive electrode material mixture (viscosity: 5,000 mPa·s), and one surface of an aluminum current collector was coated with the positive electrode material mixture, dried at 130° C., and then rolled at a density of 3.35 g/cm$^3$ to prepare a positive electrode having a porosity of 25%.

Figure 2:
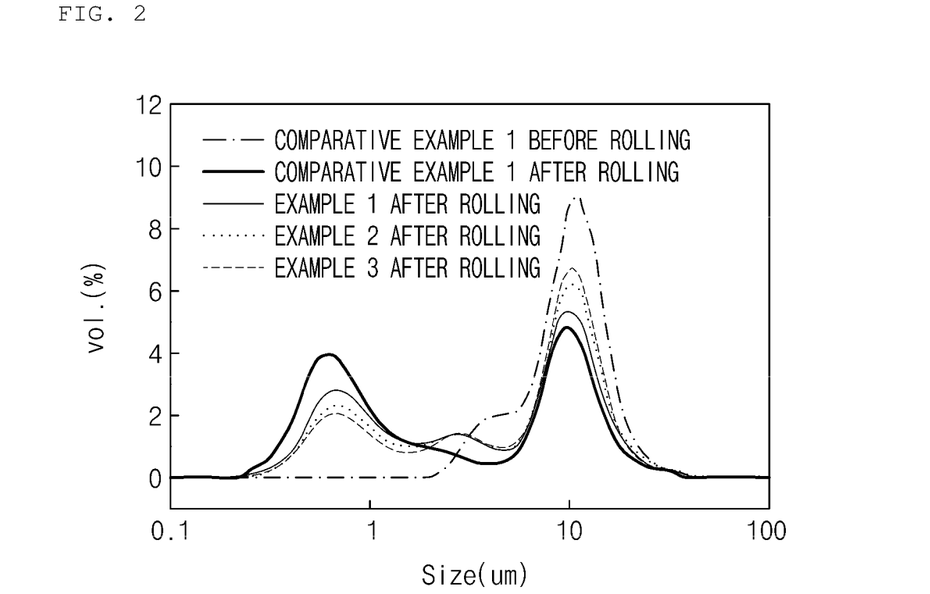
FIG. 2 is a graph illustrating particle size distributions of the positive electrode active materials according to the examples and comparative examples after rolling.

After the rolling, a degree of particle breakage was evaluated by measuring a particle size distribution using a laser diffraction particle size measurement instrument (Microtrac MT 3000) by irradiation of ultrasonic waves having a frequency of about 28 kHz and an output of 60 W, and the results thereof are present in FIG. 2.

Referring to FIG. 2, with respect to Comparative Example 1 on which a glassy coating layer was not formed, a large amount of fine particles was formed after the rolling, and a change in particle size distribution was large when compared with before the rolling, but, with respect to Examples 1 to 3 on which the glassy coating layers were respectively formed, it may be confirmed that a degree of occurrence of fine particles was reduced after the rolling, and a change in particle size distribution was reduced. Accordingly, it may be understood that the particle strengths were improved by forming the glassy coating layers respectively on Examples 1 to 3.

Also, positive electrodes were prepared as described above, a degree of particle breakage was evaluated by measuring a degree of roll press contamination using colorimeter values obtained when rolled at a distance of 200 m and 400 m relative to a rolling distance of 0 m during roll pressing, and the results thereof are present in Table 3 below.

TABLE 3

| | | Example 1 | Example 2 | Example 3 | Comparative Example 1 | Comparative Example 2 | Comparative Example 3 |
|---|---|---|---|---|---|---|---|
| Retention (%) relative to before rolling | Before rolling | 100 | 100 | 100 | 100 | 100 | 100 |
| | 200 m rolling | 81.6 | 84.3 | 91.4 | 71.7 | 75.5 | 77.1 |
| | 400 m rolling | 74.3 | 80.7 | 90.5 | 57.7 | 61.8 | 65.2 |

Referring to Table 3, with respect to Examples 1 to 3 on which the glassy coating layers were respectively formed, it may be confirmed that degrees of roll contamination were significantly reduced in comparison to that of Comparative Example 1 on which a glassy coating layer was not formed. Particularly, with respect to Example 3 on which the lithium-boron-aluminum oxide coating layer was formed, it may be confirmed that the degree of roll contamination was further reduced. With respect to Comparative Examples 2 and 3 in which the amount of manganese (Mn) was not greater than the amount of cobalt (Co), or the amount of nickel (Ni) was less than 60 mol %, the degrees of contamination were greater than those of Examples 1 to 3. Accordingly, it may be understood that the particle strengths were improved by forming the glassy coating layers respectively on Examples 1 to 3.

Experimental Example 4: Battery Performance Evaluation

Each of the positive electrode active materials prepared in Examples 1 to 3 and Comparative Examples 1 to 3, a carbon black conductive agent, and a PVdF binder were mixed in an N-methylpyrrolidone solvent at a weight ratio of 96.5:1.5:2 to prepare a positive electrode material mixture (viscosity: 5,000 mPa·s), and one surface of an aluminum current collector was coated with the positive electrode material mixture, dried at 130° C., and then rolled to prepare a positive electrode.

Natural graphite as a negative electrode active material, a carbon black conductive agent, and a PVdF binder were mixed in an N-methylpyrrolidone solvent at a weight ratio of 85:10:5 to prepare a composition for forming a negative electrode, and one surface of a copper current collector was coated with the composition to prepare a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Figure 3:
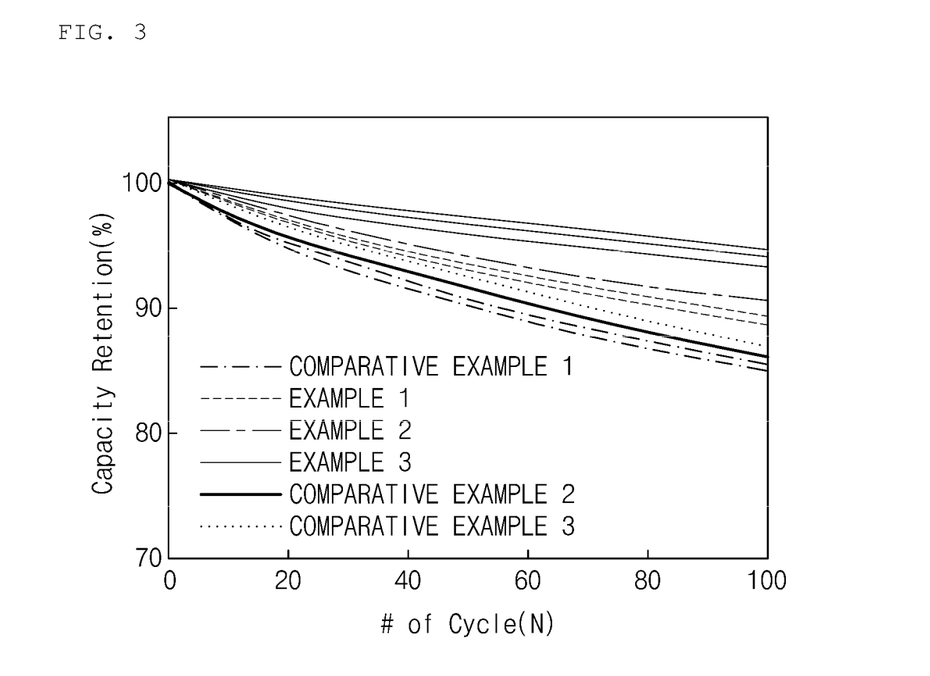
FIG. 3 is a graph illustrating high-temperature life characteristics of secondary batteries prepared by using the positive electrode active materials according to the examples and comparative examples.

Capacity retention [%] was measured while 100 cycles of charge and discharge of each lithium secondary battery full cell prepared as described above were performed under conditions including a charge end voltage of 4.25 V, a discharge end voltage of 2.5 V, and 0.3 C/0.3 C at 45° C., and the measurement results are illustrated in FIG. 3.

Figure 4:
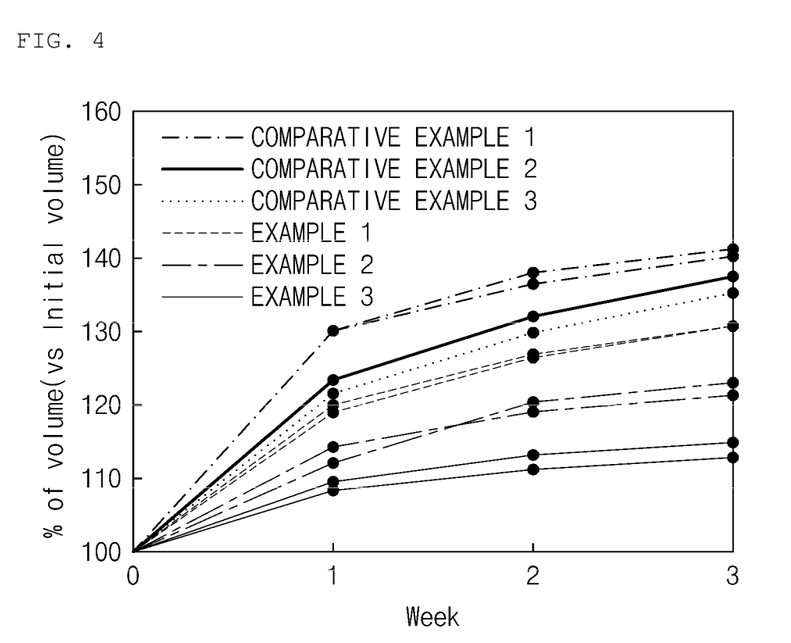
FIG. 4 is a graph illustrating amounts of gas generated during high-temperature storage of the secondary batteries prepared by using the positive electrode active materials according to the examples and comparative examples.

Also, an amount of gas generated was measured while each lithium secondary battery full cell prepared as described above was stored at 45° C. for 3 weeks, and the measurement results are illustrated in FIG. 4.

Referring to FIG. 3, it may be confirmed that high-temperature life characteristics of Examples 1 to 3, on which the glassy coating layers were respectively formed, were significantly improved in comparison to those of Comparative Example 1 on which a glassy coating layer was not formed. Also, the high-temperature life characteristics of Examples 1 to 3 were better than those of Comparative Example 2, in which the amount of manganese (Mn) was not greater than the amount of cobalt (Co), and Comparative Example 3 in which the amount of nickel (Ni) was less than 60 mol %. Particularly, with respect to Example 3 on which the lithium-boron-aluminum oxide coating layer was formed, it may be confirmed that the high-temperature life characteristics were further improved.

Referring to FIG. 4, it may be confirmed that amounts of gas generated during high-temperature storage of Examples 1 to 3, on which the glassy coating layers were respectively formed, were significantly reduced in comparison to that of Comparative Example 1 on which a glassy coating layer was not formed. Also, high-temperature storage stabilities of Examples 1 to 3 were better than those of Comparative Example 2, in which the amount of manganese (Mn) was not greater than the amount of cobalt (Co), and Comparative Example 3 in which the amount of nickel (Ni) was less than 60 mol %. Particularly, with respect to Example 3 on which the lithium-boron-aluminum oxide coating layer was formed, it may be confirmed that the high-temperature storage stability was further improved.

The invention claimed is:

1. A method of preparing a positive electrode active material for a secondary battery, the method comprising:
   preparing a lithium composite transition metal oxide including nickel (Ni), cobalt (Co), and manganese (Mn); and
   forming a coating layer by dry mixing the lithium composite transition metal oxide with a coating source including at least one selected from the group consisting of boron (B), aluminum (Al), silicon (Si), titanium (Ti), and phosphorus (P), and performing a heat treatment at a temperature of 500° C. to 750° C.,
   wherein, in the lithium composite transition metal oxide, an amount of the nickel (Ni) in a total amount of transition metals is 60 mol % or more, and an amount of the manganese (Mn) is greater than an amount of the cobalt (Co), and
   the coating layer comprises a compound represented by Formula 1:

$$Li_a M^1_b O_c \quad \text{[Formula 1]}$$

wherein, in Formula 1, $M^1$ is at least one selected from the group consisting of B, Al, Si, Ti, and P, and $1 \leq a \leq 4$, $1 \leq b \leq 8$, and $1 \leq c \leq 20$.

2. The method of claim 1, wherein, in the forming of the coating layer, a lithium source is not added.

3. The method of claim 1, wherein an amount of residual lithium by-products in the positive electrode active material is 1.0 wt % or less.

4. The method of claim 1, wherein the coating source comprises a compound containing at least one selected from the group consisting of boron (B) and aluminum (Al).

5. The method of claim 1, wherein, in the coating layer, boron and aluminum are included at a ratio of 0.3 part by weight:1 part by weight to 0.8 part by weight:1 part by weight.

6. The method of claim 1, wherein the coating source is mixed in an amount of 0.02 part by weight to 2.0 parts by weight based on 100 parts by weight of the lithium composite transition metal oxide.

* * * * *